Dec. 1, 1931.  F. H. GILCHRIST  1,834,917
METHOD OF AND APPARATUS FOR SURFACING ROOFING
Filed Feb. 14, 1929  2 Sheets-Sheet 1
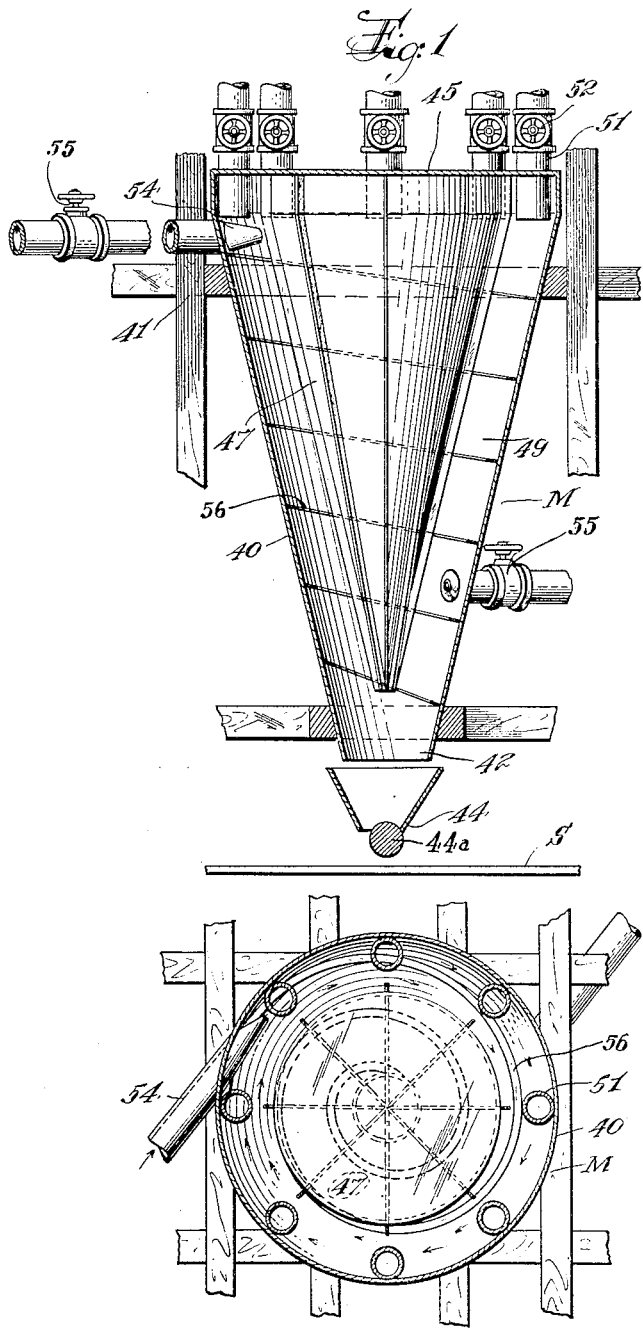
INVENTOR
Frank H. Gilchrist
BY
Samuel Stearman
ATTORNEY

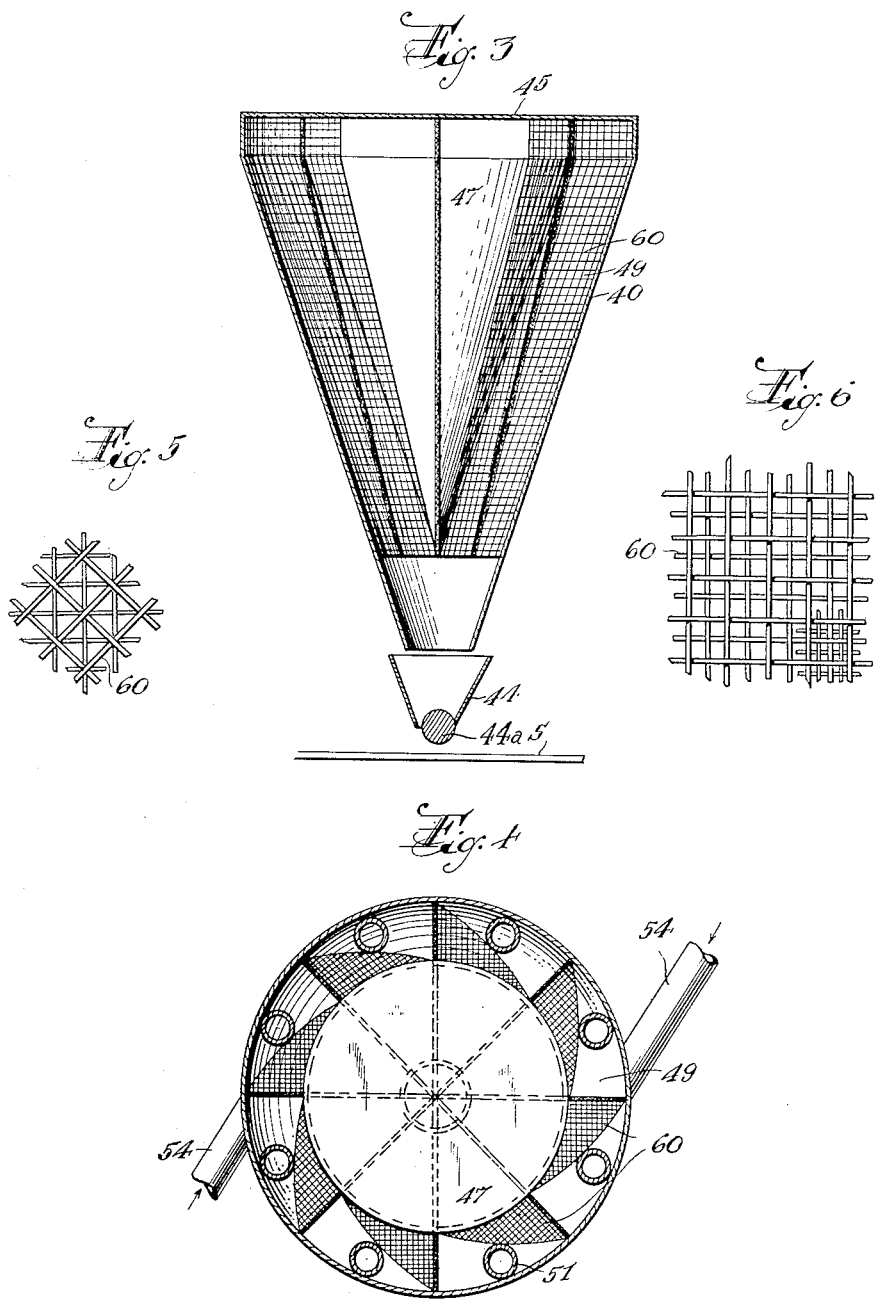

Patented Dec. 1, 1931

1,834,917

UNITED STATES PATENT OFFICE

FRANK H. GILCHRIST, OF WILMETTE, ILLINOIS, ASSIGNOR, BY MESNE ASSIGNMENTS, TO THE PATENT AND LICENSING CORPORATION, OF BOSTON, MASSACHUSETTS, A CORPORATION OF MASSACHUSETTS

METHOD OF AND APPARATUS FOR SURFACING ROOFING

Application filed February 14, 1929. Serial No. 339,943.

This invention relates to a method of and apparatus for causing intimate admixture of comminuted or granular material while the said material is passing in substantially continuous streams from a source of supply to the point of application.

My invention finds one particular adaptation in the asphalt roofing industry wherein roofing is made from a base of fibrous material, suitably impregnated with a waterproofing substance and coated on one or both of its surfaces with a protecting layer of asphalt within which is imbedded granular or comminuted mineral surfacing, such as crushed slate or the like. The weather-exposed surfacing has as one of its chief functions the protection of the asphalt coating layer from the weathering effects of the sun's rays, but it has another and indeed very important purpose, namely:—to provide the roofing with a decorative finish. The trend in present day commercial practice is to utilize mineral surfacing of various colors and to select the colors judiciously in order to produce a pleasing harmonious color effect on the roof.

It is known that mineral surfacing of what may be termed a secondary colortone, can be produced by combining selected proportions of mineral of different primary colors. In order to effect a uniform admixture of differently colored minerals, it has been necessary to measure out the desired quantities of the separate minerals, and then puddle, or shovel, the ingredients together by hand until the differently colored minerals became thoroughly amalgamated or intermingled with one another.

The object of my invention is to provide a method of and means for continuously and rapidly causing regulated quantities of differently colored mineral grits to become thoroughly and uniformly admixed, so as to form a charge of a secondary or composite color from the differently colored minerals.

In accordance with my invention, crushed mineral, of the desired colors, is fed continuously to and through a relatively small passageway in a mixing device, and the intermixture of the mineral granules is effected by a relatively strong blast or current of air which, preferably, is supplied continuously to the mixing device by means of nozzles extending through suitable openings in the wall thereof. Provision is made for causing the mineral delivered to the mixing chamber to spread into thin curtain-like films so that in the passage of the mineral, through the mixing chamber, the intimate admixture of the constituents will be facilitated.

The construction and operation of the apparatus as well as the advantages thereof, will be more clearly apparent from a reading of the following description, in connection with the accompanying drawings, in which, Figure 1 is a vertical section through one form of the apparatus;

Figure 2 is a view in horizontal cross-section through the upper part of the apparatus shown in Figure 1;

Figure 3 is a view similar to Figure 1, but showing another form of the apparatus;

Figure 4 is a view similar to Figure 2 but showing the apparatus of Figure 3, and Figures 5 and 6 are details showing various arrangements of baffling-grids that may be employed in conjunction with the apparatus of Figures 3 and 4.

Referring in detail to the drawings, the letter S represents a sheet of asphalt saturated and coated roofing base which is to be covered with a surfacing layer of crushed slate, or the like, of a composite color, that is to say, of a secondary color resulting from the intimate admixture of two or more separately colored minerals.

The mixing apparatus is indicated as a whole by the letter M and comprises an outer casing 40 in the shape of an inverted cone, supported above the sheet in a suitable frame 41, and having the lower open end 42 thereof, positioned in close proximity to a distributing hopper 44 provided with a rotating feed roll 44a, by which the mineral mixture discharged from the mixing device is fed to the sheet S. The upper end of the casing 40 is preferably provided with a closure member 45 which may either be removable from or integral with the casing. Suspended from the lower surface of the top or closure 45 is a conical spacer 47 the surface of which is substantially concentric at all points with the wall of casing 40, and terminating slightly above the lower end 42 of the casing. An annular passageway or mixing chamber 49, is thus provided between the outer surface of the spacer and the inner wall of the casing, and to this passageway the differently colored mineral grits are fed in continuous streams to be mixed during their passage therethrough. The grits of different colors are fed to the passageway 49 through feed conduits 51 connected with storage supplies, and projecting through the top of the casing into the said passageway, the several feed pipes being provided with valves 52 which may be in the form of shuttered apertures for controlling the relative rates of flow of the mineral therethrough. The admixture of the minerals of different colors is induced and effected chiefly by introducing into the passageway 49 a strong blast or current of compressed air, and to this end any suitable form of jets or nozzles 54 are provided, through which air from a compressor is forced into the mixing chamber. The nozzles or jets are fixed to the casing 40 so as to project into the passageway 49 in a more or less tangential direction and create a whirlpool or cyclone effect in the mixing chamber. I have shown two such nozzles, one adjacent the upper end of the casing and the other adjacent the lower end thereof, but it will be clear that the number and relative location of the nozzles may vary in accordance with the size and capacity of the apparatus, the pressure of the air available, etc. The supply pipes for the nozzles are valved as shown at 55.

The degree of mixing effected by the air blast may be regulated by regulating the relative rates of flow of the separate minerals, as well as the amount and pressure of the air introduced into the mixing chamber through the nozzles.

Thus, mineral grit of any one color may be fed through any one or more of the pipes 51 while grit of another color, or colors, is fed through the remaining pipes. For example, with eight feed pipes as illustrated in the drawings, red mineral may be fed through four of the pipes, preferably through alternately adjacent pipes, and green mineral may be fed through the four intervening pipes. In this instance (assuming the velves in each of the pipes are opened to the same extent), there will be fed to the mixing device substantially equal parts of red and green mineral. Or, red mineral may be fed through four of the pipes, green through two of the others, and yellow through the remaining two, in which event the charge will be substantially one half red, one-fourth green, and one-fourth yellow. Hence, the number of pipes used, as well as the position of the valves therein, will determine the composition of the charge.

As the variously colored mineral grits charged to the device, drop thereinto, they will come substantially immediately under the influence of the whirlpool or cyclone of air in the mixing chamber, and will be intermingled thereby into a uniform and intimate admixture. In order to facilitate the mixing action of the air currents in the mixing chamber, a continuous spiral baffle 56 is secured to the inner wall of the casing 40, the effect of which is to continually spread the streams of grit into thin films or curtains so as to enable the air currents more readily to throw the grits around and intersperse them in more complete fashion. By regulating the amount and pressure of the air supply fed to the mixing chamber, the degree of mixing attained can be selectively controlled in conjunction with the regulation of the feed of mineral, within any desired predetermined limits, so as to attain a variety of effects ranging from a complete mixture of the differently colored minerals fed to the mixing device, to a minimum mixing thereof.

The air supply may be the ordinary air obtained from the room, at normal room temperature, although it may be advantageous to preheat the air before introducing it into the mixing chamber, as with certain grades of roofing granules, a more perfect adherence to the coated sheet is secured when such granules are at a more or less elevated temperature. In some instances also, the air jets may be treated with, or even substituted by, a spray of oil. This expedient is especially effective for certain grades of granules which are known to be less liable to contribute to blistering of the exposed roofing when they are coated with a thin film of oil prior to deposition upon the coated sheet.

Where the sheet of roofing to be surfaced is of greater width than can be acommodated by the capacity of a single mixing device as above described, I may employ a plurality of such devices arranged side by side, the supply of mineral and compressed air or the like, to the several mixing devices being either identical so as to produce substantially uniform effects across the sheet, or the said supplies may be different for the several devices so as to deposit longitudinal ribbons or bands of colored mineral upon the sheet, the respective bands or ribbons thus produced being more or less different in color, as may be desired. When more than one mixing device is employed, a single elongated distributing hopper 44, of a length corresponding to the width of the sheet, may be positioned beneath the outlets of the several mixing devices, so as to receive the mineral discharged therefrom and deliver the same to the coated sheet, it being understood that the distriubuting hopper in such case would function as in the first instance, merely to distribute the mineral uniformly upon the coated surface of the sheet, and would not interfere with the preservation of the identity of the separate streams produced by the respective mixing devices, where such streams are at all different.

The valves controlling the flow of mineral through the feed pipes 51 as well as the valves 55 controlling the air supply, may, if desired, be operated automatically instead of manually.

In Figures 3 to 6, I have shown a modified form of the mixing apparatus, certain of the parts being omitted from Figure 3 for clearness of illustration. In this form of apparatus, the mixing chamber 49 has mounted therein a series of reticulated baffles or wire-mesh screens 60, arranged generally vertically, but twisted into more or less spiral formation. The spreading of the streams of grit in this form of the apparatus is accomplished by the baffles 60 and these latter serve also to assist in the intermingling of the various colored grits as they are carried around in the mixing chamber by the air currents therein. I prefer to construct and arrange the baffles 60 in such a manner that the cross-wires of one baffle are staggered or arranged at an angle with respect to those of the adjacent baffles. In Figures 5 and 6 I have shown by way of illustration, enlarged developments of several adjacent baffles. In Figure 5, one of the baffles has its cross-wires disposed horizontally and vertically, while the cross-wires of the adjoining baffle are diagonally disposed. In Figure 6, two of the adjoining baffles have their cross-wires in parallel but staggered relation, while a third baffle has cross-wires parallel to those of the first two, but of finer mesh. With these expedients, the baffling, spreading, and intermingling of the grits may be more readily achieved.

I claim as my invention:

1. A method of forming a composite mixture of differently colored mineral granules which comprises feeding separate streams of said differently colored minerals through a confined passageway, and subjecting said differently colored minerals to the action of fluid pressure during their passage througn said passageway, whereby to cause them to intermingle and form a composite charge of predetermined composition.

2. A method of forming a composite mixture of differently colored granules which comprises feeding separate streams of said differently colored minerals through a confined passageway, and introducing compressed air to said passageway while said differently colored minerals are passing therethrough, whereby to cause said minerals to intermingle and form a composite charge of predetermined composition.

3. A method of forming a composite mixture of differently colored mineral granules which comprises feeding separate streams of said differently colored minerals through a confined passageway, spreading the streams thus fed to said passageway into thin films, and subjecting said differently colored minerals to the action of fluid pressure during their passage through said passageway, whereby to cause them to intermingle and form a composite charge of predetermined composition.

4. A method of forming a composite mixture of differently colored granules which comprises feeding separate streams of said differently colored minerals through a confined passageway, spreading the streams thus fed to said passageway into thin films, and introducing compressed air to said passageway while said differently colored minerals are passing therethrough, whereby to cause said minerals to intermingle and form a composite charge of predetermined composition.

5. In apparatus for surfacing roofing, a mixing chamber, means for delivering separate streams of comminuted minerals of different colors to said chamber, and means for introducing a blast of air to said chamber for causing said minerals to commingle.

6. In an apparatus for producing colored granular mineral mixtures, the combination of a mixing chamber, means for delivering to said chamber separate streams of differently colored mineral granules, and fluid-pressure supply-means connected with said chamber for causing the minerals from said separate streams to intermingle.

7. Apparatus of the character described comprising a mixing chamber, means for delivering to said chamber differently colored minerals in separate streams, and means for effecting intermixture of the minerals from said streams, said last named means including compressed air supplies for said chamber and baffles disposed therein.

8. A method of forming a mixture of granules of predetermined composition which comprises feeding regulated amounts of each type of granules that are to be present in the mixture in a separate stream to a confined passageway, and subjecting these different types of granules to the action of a regulated fluid pressure during their passage through the passageway, whereby to cause the granules to become admixed to form a predetermined composition depending upon the amount of each type of granules present and the fluid pressure intensity.

9. A method of forming a mixture of granules of predetermined composition which comprises continuously feeding regulated amounts of each type of granules that are to be present in the mixture, with each type of granules being fed in a separate stream through a confined passageway, and subjecting said granules to the action of regulated fluid pressure during the passage of said granules through said passageway, whereby to cause the particles to admix to a predetermined composition depending on the amount of each of the separate types of granules present and the fluid pressure intensity, and maintaining a substantially uninterrupted discharge of the mixture from said passageway during the operation.

10. A method of forming a mixture of granules of predetermined composition which comprises feeding regulated amounts of each type of the granules that are to be present in the mixture, with each type of granules being fed in a separate stream to a confined passageway, subjecting said particles to the action of regulated fluid pressure during their passage through said passageway, and spreading the streams thus fed to said passageway into thin films whereby to cause the particles to intermingle and form a composite charge of predetermined composition depending on the amount of each of the separate types of granules present and the fluid pressure intensity.

11. A method of forming a mixture of particles of predetermined composition which comprises continuously feeding regulated amounts of each type of the granules that are to be present in the mixture, with each type of granules being fed in a separate stream to a confined passageway, subjecting said granules to the action of regulated fluid pressure during their passage through said passageway, spreading the streams thus fed to said passageway into thin films whereby to cause the particles to intermingle and form a composite charge of predetermined composition depending on the amount of each of the different types of granules present and the fluid pressure intensity, and continuously removing the mixture in substantially uninterrupted discharge from said passageway during the operation.

12. In apparatus for the purpose described having a mixing chamber, means for delivering separate streams of comminuted particles of different colors to said chamber, and means for introducing a blast of air to said chamber for causing the particles to commingle, the said chamber having means that spreads the different colored granules into thin films.

13. In apparatus for the purpose described, a mixing chamber, a spirally arranged baffling member within said chamber, means for continuously delivering separate streams of differently colored granules to said chamber and means for supplying fluid pressure to said chamber for causing the intermingling of the separate streams of particles.

Signed at New York, in the county of New York and State of New York, this 5th day of February, A. D. 1929.

FRANK H. GILCHRIST.